(12) United States Patent
Forutanpour et al.

(10) Patent No.: US 9,171,384 B2
(45) Date of Patent: Oct. 27, 2015

(54) HANDS-FREE AUGMENTED REALITY FOR WIRELESS COMMUNICATION DEVICES

(75) Inventors: Babak Forutanpour, San Diego, CA (US); Ruben M. Velarde, Chula Vista, CA (US); David L. Bednar, San Diego, CA (US); Brian Lee Momeyer, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 13/536,543

(22) Filed: Jun. 28, 2012

(65) Prior Publication Data
US 2013/0113827 A1 May 9, 2013

Related U.S. Application Data

(60) Provisional application No. 61/557,265, filed on Nov. 8, 2011.

(51) Int. Cl.
*G09G 5/377* (2006.01)
*G06T 11/00* (2006.01)
*G06T 3/40* (2006.01)
(Continued)

(52) U.S. Cl.
CPC .......... *G06T 11/00* (2013.01); *G06F 17/30244* (2013.01); *G06T 3/4038* (2013.01); *G06T 19/006* (2013.01)

(58) Field of Classification Search
CPC .................................................. G06T 2210/21
USPC ......................................................... 345/633
See application file for complete search history.

(56) References Cited

U.S. PATENT DOCUMENTS 6,452,597 B1 *  9/2002  Goldberg et al. .............. 345/472
6,552,744 B2 *  4/2003  Chen .......................... 348/218.1
(Continued)

FOREIGN PATENT DOCUMENTS

JP   2012212343 A   11/2012
WO  2012132334 A1  10/2012

OTHER PUBLICATIONS

A panorama-based technique for annotation overlay and its real-time implementation Kourogi, M. ; Kurata, T. ; Sakaue, K. ; Muraoka, Y. Multimedia and Expo, 2000. ICME 2000. 2000 IEEE International Conference on vol. 2 DOI: 10.1109/ICME.2000.871448 Publication Year: 2000 , pp. 657-660 vol. 2.*

(Continued)

*Primary Examiner* — Javid A Amini
(74) *Attorney, Agent, or Firm* — Shumaker & Sieffert, P.A.

(57) ABSTRACT

This disclosure relates to techniques for providing hands-free augmented reality on a wireless communication device (WCD). According to the techniques, an application processor within the WCD executes an augmented reality (AR) application to receive a plurality of image frames and convert the plurality of image frames into a single picture comprising the plurality of image frames stitched together to represent a scene. The WCD executing the AR application then requests AR content for the scene represented in the single picture from an AR database server, receives AR content for the scene from the AR database server, and processes the AR content to overlay the single picture for display to a user on the WCD. In this way, the user may comfortably look at the single picture with the overlaid AR content on a display of the WCD to learn more about the scene represented in the single picture.

42 Claims, 5 Drawing Sheets

(51) Int. Cl.
*G06T 19/00* (2011.01)
*G06F 17/30* (2006.01)

(56) References Cited

U.S. PATENT DOCUMENTS

| | | | | |
|---|---|---|---|---|
| 6,748,316 | B2* | 6/2004 | Takayama et al. | 701/428 |
| 7,406,663 | B2* | 7/2008 | Treibach-Heck et al. | 715/788 |
| 8,005,831 | B2 | 8/2011 | Hull et al. | |
| 2004/0228401 | A1* | 11/2004 | Chen | 375/240 |
| 2006/0023075 | A1* | 2/2006 | Cutler | 348/218.1 |
| 2007/0025723 | A1* | 2/2007 | Baudisch et al. | 396/287 |
| 2008/0147730 | A1* | 6/2008 | Lee et al. | 707/104.1 |
| 2009/0109216 | A1* | 4/2009 | Uetabira | 345/419 |
| 2009/0289956 | A1* | 11/2009 | Douris et al. | 345/633 |
| 2010/0122161 | A1* | 5/2010 | Jardine-Skinner et al. | 715/256 |
| 2010/0145676 | A1* | 6/2010 | Rogers | 704/9 |
| 2010/0208033 | A1 | 8/2010 | Edge et al. | |
| 2010/0268451 | A1 | 10/2010 | Choi | |
| 2011/0209201 | A1 | 8/2011 | Chollat | |
| 2011/0242134 | A1 | 10/2011 | Miller et al. | |
| 2011/0285811 | A1* | 11/2011 | Langlotz et al. | 348/37 |
| 2012/0036444 | A1* | 2/2012 | Andersen | 715/738 |
| 2012/0155532 | A1* | 6/2012 | Puri et al. | 375/240.02 |
| 2012/0174004 | A1* | 7/2012 | Seder et al. | 715/764 |
| 2012/0221687 | A1* | 8/2012 | Hunter et al. | 709/219 |
| 2012/0230388 | A1* | 9/2012 | Chen | 375/240.01 |
| 2013/0063550 | A1* | 3/2013 | Ritchey et al. | 348/36 |
| 2013/0171601 | A1* | 7/2013 | Yuasa et al. | 434/258 |
| 2014/0055491 | A1* | 2/2014 | Malamud et al. | 345/633 |
| 2014/0096159 | A1* | 4/2014 | Rowe et al. | 725/43 |

OTHER PUBLICATIONS

Real-time panoramic mapping and tracking on mobile phones; Wagner, Daniel ; Graz Univ. of Technol., Graz, Austria ; Mulloni, Alessandro ; Langlotz, Tobias ; Schmalstieg, D., 2010.*
International Search Report and Written Opinion—PCT/US2012/059584—ISA/EPO—Jan. 18, 2013 (13 pages).
Langlotz, et al., "Online Creation of Panoramic Augmented-Reality Annotations on Mobile Phones", IEEE Pervasive Computing, 2012, pp. 56-63.
Wagner D., et al., "Real-time panoramic mapping and tracking on mobile phones," Virtual Reality Conference (VR) 2010 IEEE, Mar. 20, 2010, pp. 211-218.
Wither, J., et al., "Indirect augmented reality", Computers and Graphics, Elsevier, GB, vol. 35, No. 4, Apr. 28, 2011, pp. 810-822, XP028245049, ISSN: 0097-8493, DOI: 10.1016/J.CAG.2011.04.010 [retrieved on May 11, 2011].
Second Written Opinion from International Application No. PCT/US2012/059584, dated Apr. 11, 2014, 7 pp.
International Preliminary Report on Patentability from corresponding PCT Application Serial No. PCT/US2012/059584 dated Jun. 2, 2014 (42 pages).
Office Action from corresponding Japanese Application Serial No. 2014-541073 dated Jun. 30, 2015 including translation (7 pages).

* cited by examiner

HANDS-FREE AUGMENTED REALITY FOR WIRELESS COMMUNICATION DEVICES

This application claims the benefit of U.S. Provisional Application No. 61/557,265, filed Nov. 8, 2011, the entire contents of which are incorporated herein by reference.

TECHNICAL FIELD

The disclosure relates to wireless communication devices and, more particularly, augmented reality applications on wireless communication devices.

BACKGROUND

Wireless communication devices (WCDs) include mobile telephones, portable computers with wireless communication cards, personal digital assistants (PDAs), portable media players, portable gaming devices, or other devices with wireless communication capabilities, including so-called "smart" phones and "smart" pads or tablets. WCDs are typically powered by limited battery resources. Improved battery life and battery life conservation are, therefore, of paramount concern when designing WCDs and applications running on WCDs. The concern for battery life is offset, however, by demands for increased features in applications running on WCDs.

As one example, augmented reality (AR) applications are becoming increasingly popular on WCDs. An AR application operates in a WCD by gathering information for a scene represented in real-time video being captured by a camera within the WCD. The AR application sends the real-time video to an AR server. The AR application then receives AR content from the AR server for the scene represented in the real-time video, and overlays the AR content on the real-time video for display to a user. The AR content may include information about businesses, landmarks, transportation, people, objects, and the like, included in the scene of the real-time video.

When the AR application is executing in the WCD, the above steps may occur to present AR content for each scene of real-time video to a user of the WCD. For example, the user of the WCD may shoot video in a single direction along a city street and receive information for that scene. When the user shifts, tilts, or pans the WCD, the camera within the WCD will capture real-time video representing a different scene, e.g., in a different direction along the same street, and the above steps will be repeated to receive information for the new scene.

SUMMARY

In general, this disclosure relates to techniques for providing hands-free augmented reality on a wireless communication device (WCD). According to the techniques, an application processor within the WCD executes an augmented reality (AR) application to receive a plurality of image frames and convert the plurality of image frames into a single picture that includes the plurality of image frames stitched together to represent a scene. After converting the image frames into the single picture, the WCD executing the AR application requests AR content for the scene represented in the single picture from an AR database server, receives AR content for the scene from the AR database server, and processes the AR content to overlay the single picture for display to a user on the WCD. In this way, the user may comfortably look at the single picture with the overlaid AR content on a display of the WCD to learn more about the scene represented in the single picture, e.g., without necessarily directing the WCD at the scene on a continuing basis after the scene is captured. For example, the AR content may include information about businesses, landmarks, transportation, people, objects, and the like, included in the scene of the single picture.

In one example, the disclosure is directed toward a method of executing an augmented reality application with a WCD comprising receiving, with a processor of the WCD, a plurality of image frames each representing a portion of a scene, and converting the plurality of image frames into a single picture, wherein the single picture comprises the plurality of image frames stitched together to represent the scene. The method further comprises requesting AR content for the scene represented in the single picture from an AR database server, receiving AR content for the scene represented in the single picture from the AR database server, and processing the AR content to overlay the single picture for display on the WCD.

In another example, this disclosure is directed toward a WCD for executing an augmented reality application comprising a memory to store image data, a processor configured to receive a plurality of image frames each representing a portion of a scene, convert the plurality of image frames into a single picture, wherein the single picture comprises the plurality of image frames stitched together to represent the scene, requesting AR content for the scene represented in the single picture from an AR database server, receive AR content for the scene represented in the single picture from the AR database server, and process the AR content to overlay the single picture, and a display to present the single picture with the overlaid AR content to a user of the WCD.

In a further example, this disclosure is directed toward a WCD for executing an augmented reality application comprising means for receiving a plurality of image frames each representing a portion of a scene, and means for converting the plurality of image frames into a single picture, wherein the single picture comprises the plurality of image frames stitched together to represent the scene. The WCD also comprises means for requesting AR content for the scene represented in the single picture from an AR database server, means for receiving AR content for the scene represented in the single picture from the AR database server, and means for processing the AR content to overlay the single picture for display on the WCD.

In another example, this disclosure is directed toward a computer-readable medium comprising instructions for executing an augmented reality application that when executed in a WCD cause one or more programmable processors to receive a plurality of image frames each representing a portion of a scene, convert the plurality of image frames into a single picture, wherein the single picture comprises the plurality of image frames stitched together to represent the scene, request AR content for the scene represented in the single picture from an AR database server, receive AR content for the scene represented in the single picture from the AR database server, and process the AR content to overlay the single picture for display on the WCD.

The details of one or more examples of the disclosure are set forth in the accompanying drawings and the description below. Other features, objects, and advantages will be apparent from the description and drawings, and from the claims.

DETAILED DESCRIPTION

Figure 1:
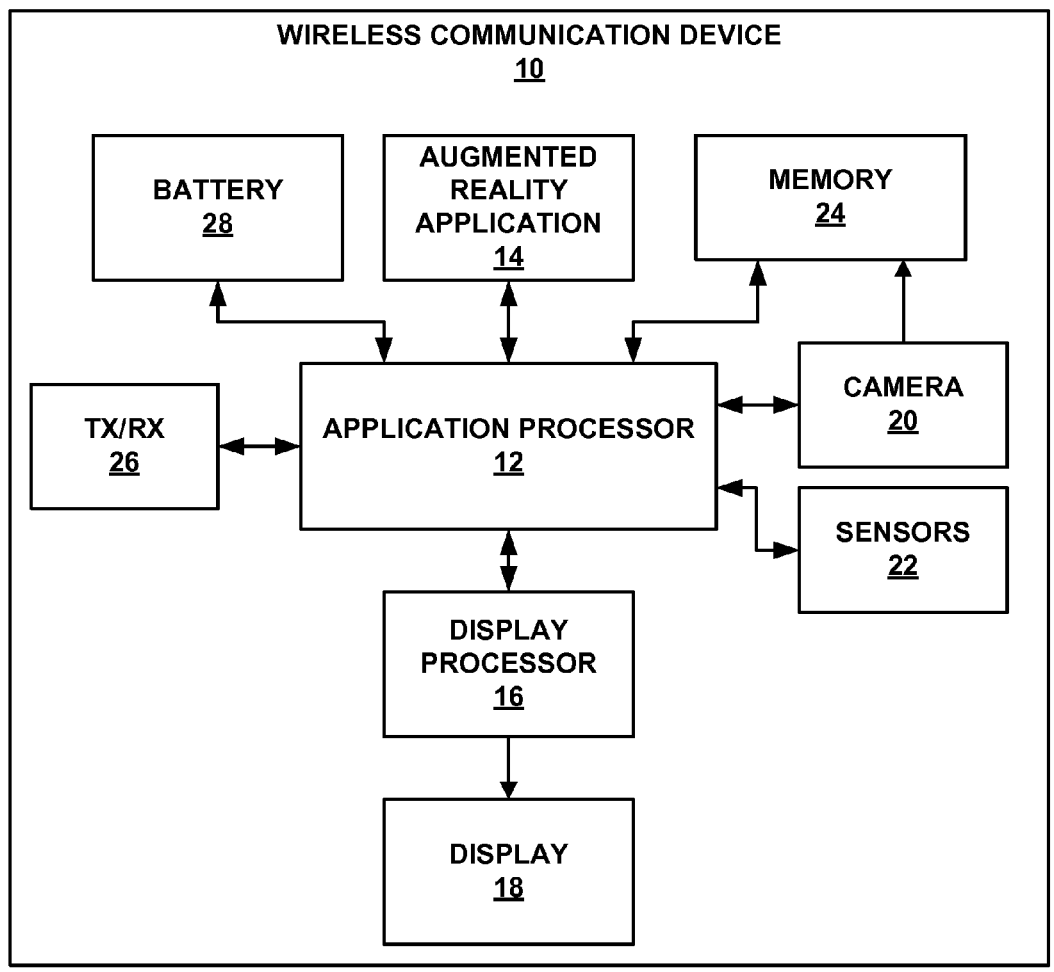
FIG. 1 is a block diagram illustrating a wireless communication device (WCD) capable of providing hands-free augmented reality according to an example of the disclosed techniques.

FIG. 1 is a block diagram illustrating a wireless communication device (WCD) 10 capable of providing hands-free augmented reality according to the disclosed techniques. The techniques may be considered "hands-free" because a user does not need to continuously hold out WCD 10 with a camera 20 pointed at a scene to receive and review augmented reality (AR) content for the scene. Instead, the techniques enable the user to comfortably hold WCD 10 in the user's lap or place WCD 10 on a table to review the AR content for a scene after the scene is captured without directing WCD 10 at the scene on a continuing basis.

WCD 10 may be a mobile device, including a mobile telephone, a portable computer with a wireless communication card, a personal digital assistant (PDA), a portable media player, a portable gaming device, or another device with wireless communication capabilities, including a so-called "smart" phone and "smart" pad or tablet computer. As illustrated in FIG. 1, WCD 10 includes an application processor 12, an augmented reality (AR) application 14, a display processor 16, a display 18, a camera 20, one or more sensors 22, a memory 24, a transmitter/receiver (TX/RX) 26, and a battery 28, i.e., a battery-based power supply.

In general, application processor 12 provides an environment in which a variety of applications, including AR application 14, may run on WCD 10. Additional example applications include texting applications, email applications, video game applications, video or picture slideshow applications, presentation applications, video conferencing applications, and the like. Application processor 12 may receive data for use by these applications from memory 24, camera 20, and/or sensors 22. Camera 20 may include an image sensor capable of capturing still pictures and/or video. Sensors 22 may include a compass sensor, a global positioning signal (GPS) sensor, or another type of location determination sensor built into WCD 10. To present the application data on WCD 10, display processor 16 processes image data from application processor 12 for presentation on display 18. In some cases, WCD 10 may also include a video encoder, a video decoder and/or a combination of a video encoder and decoder known as a "CODEC".

According to the techniques of this disclosure, application processor 12 within WCD 10 executes an augmented reality (AR) application 14 to receive a plurality of image frames representing different portions of a scene, and convert the plurality of image frames into a single picture that includes the plurality of image frames. All or portions of the plurality of image frames may be stitched together to form a single picture representing the scene. After converting the image frames into the single picture, application processor 12 requests AR content for the scene represented in the single picture from an AR database server, receives AR content for the scene from the AR database server, and processes the AR content to overlay the single picture for display to a user on WCD 10. In this way, the user may comfortably look at the single picture with the overlaid AR content on a display 18 of the WCD 10 to learn more about the scene represented in the single picture, e.g., while not oriented toward the scene captured in the single picture.

AR application 14, when executed by application processor 12, provides a user of WCD 10 with information about a scene represented in a single picture. The scene represented in the single picture may include outdoor areas including streets, buildings, vehicles, parks, bodies of water, and the like. The scene may also include indoor areas including the interior of office buildings and shopping malls. In addition, the scene may include people. The above list of scene types is exemplary and does not provide an exhaustive list of the types of scene for which AR content may be provided through AR application 14.

The AR content provided for the scene may include information about businesses within the scene, such as hours of operation, menus and specials for restaurants and bars, sales at grocery and retail stores, upcoming events, and/or customer ratings of the businesses. The AR content may also include information about the city or neighborhood included in the scene, such as public transportation timetables, public park information, historic sites and events, tourist information, and/or locations of police and emergency services. In addition, the AR content may include translations of foreign language signs included in the scene. The AR content may further include identification of people included in the scene, such as whether and how a person is connected to the user via a social networking company. The AR content may also include environmental information such as temperature, weather forecasts, and/or pollution and allergen levels. The above list of types of AR content is exemplary and does not provide an exhaustive list of the types of information that may be provided about a scene through AR application 14.

Figure 2:
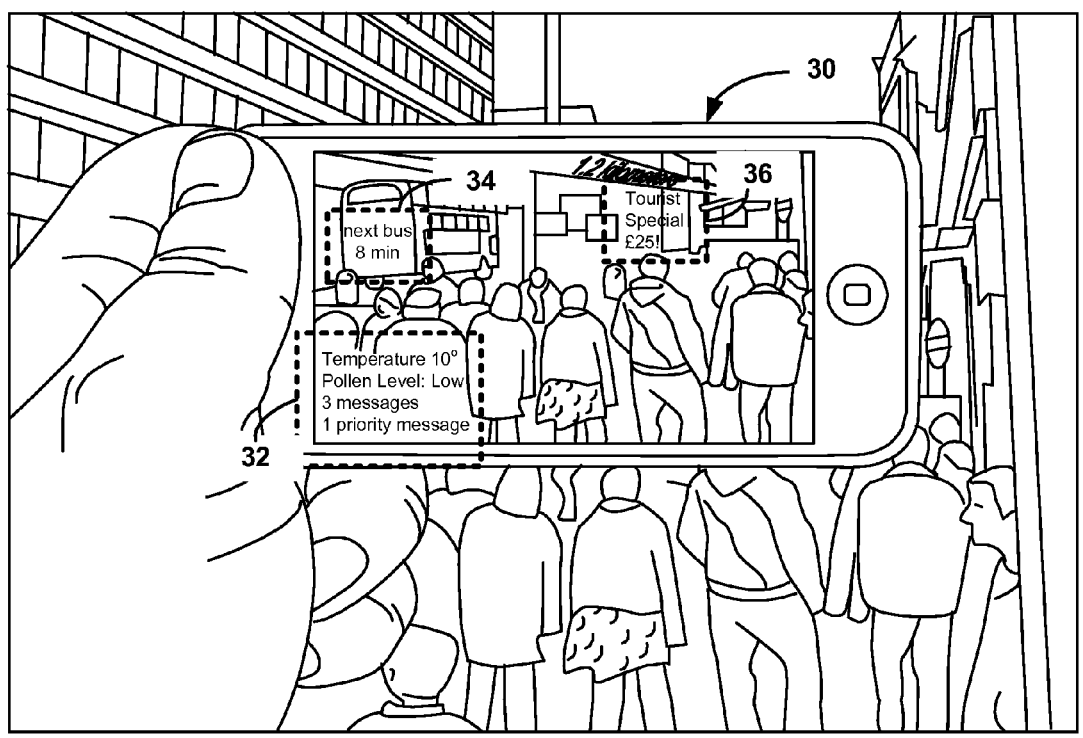
FIG. 2 is a conceptual diagram illustrating an exemplary WCD executing an augmented reality application according to conventional techniques.

Conventionally executed AR applications require a user to continuously hold out the WCD and shoot real-time video of a scene in a single direction with a camera included in the WCD. While the user holds out the WCD and shoots real-time video, the user is able to view the AR content overlaid on the real-time video displayed on the WCD in a "preview" window. Once the user drops his arms and stops shooting real-time video, the scene and the AR content is no longer available for the user to view. An example of a conventionally executed AR application is illustrated in FIG. 2.

The conventional techniques may make users self conscious, and can lead to arm fatigue or so-called "gorilla arms" from having to continuously hold out the WCD to both shoot real-time video and view the AR content over the AR video. One solution to provide hands-free augmented reality has been to wear virtual reality (VR) goggles that overlay the AR content for the scene onto goggles or glasses worn by the user. These goggles may be considered "geeky" and make the user even more self conscious then holding out a WCD. In addition, the VR goggles are typically expensive. Both of these conventional techniques are undesirable because they may make the user self conscious and less likely to use the AR applications.

The techniques of this disclosure avoid these issues by converting previously shot or recorded image frames into a single picture representing a scene, and overlaying AR content for the scene on the single picture. This allows a user to view the AR content for the scene at any time and in any location without having to be oriented toward the scene. In this way, the techniques provide hands-free augmented reality without the need for goggles or other external devices to WCD 10.

More specifically, according to the techniques of this disclosure, application processor 12 executes AR application 14 to receive a plurality of image frames that each represents a portion of a scene. The image frames may be a plurality of still pictures or a plurality of video frames of video data of the scene. In some cases, the image frames may be received from a storage device external to WCD 10. In other cases, the image frames may be captured by camera 20 included in WCD 10.

Unlike conventional techniques that require a user to continuously run a video camera included in a WCD and view the AR content over-laid on the real-time video in a preview window of the WCD, the techniques allow the user to take multiple still pictures or a few seconds of video data of a scene. In some examples, the image frames may be captured by sweeping camera 20 included in WCD 10 across the scene in a panoramic manner to capture a plurality of still pictures or a few seconds of video that includes a plurality of video frames. The captured image frames may then be sent directly to application processor 12 for use by AR application 14, or the image frames may be stored in memory 24 and later retrieved by application processor 12 for use by AR application 14.

Application processor 12 then converts the plurality of image frames, either from multiple still pictures or several seconds of video data, into a single picture comprising the plurality of image frames stitched together to represent a scene. In some examples, application processor 12 within WCD 10 may form the single picture by stitching the plurality of image frames together. Application processor 12 may perform stitching in any of a variety of conventional ways, such as those used conventionally to stitch panoramic scenes. In other examples, application processor 12 within WCD 10 may send the image frames to a remote server via TX/RX 26. In this example, application processor 12 instructs the remote server to stitch the plurality of image frames together to form the single picture, and receives the single picture back from the remote server. The single picture may represent a city street, a historical site, a neighborhood, or the like, in multiple directions. In this way, the single picture may comprise a panoramic representation of the scene.

As an example, the user may shoot the scene in a panoramic manner by rotating camera 20 included in WCD 10 by 180 or 360 degrees from a given location. In the case of video data, the user may simply sweep camera 20 of WCD 10 across the scene to shoot approximately 30 frames per second. In the case of still pictures, the user may take a still picture with camera 20 of WCD 10, move camera 20 a few degrees and take the next still picture, and then move camera 20 again to take another still picture, and so on over the entire scene. In either case, application processor 12 or the remote server may stitch the captured image frames together to generate a single panoramic picture. To generate the single picture from multiple still pictures, application processor 12 or the remote server may be configured to fit the multiple still pictures together and eliminate redundant information between the pictures to form a seamless single picture. To generate the single picture from multiple video frames, i.e., a few seconds of video data, application processor 12 or the remote server may temporally down sample the video frames and eliminate redundant information between the video frames to form a seamless single picture.

The generated single picture may be a very large image with a size of 6000×1280 pixels, for example. In some cases, the user of WCD 10 or application processor 12 of WCD 10 may decide a priori whether to generate the single picture by stitching together the image frames at WCD 10 or by sending the image frames to be stitched together at the remote server. Whether the single picture is generated at WCD 10 or at a remote server may depend on an amount of memory, battery life, and processing strength at WCD 10, the current data rate available to WCD 10, and the cost per megabyte (MB) of data. Application processor 12, for example, may compare the processing power of WCD 10 with the processing power of the remote server. Application processor 12 may also look at signal strength to determine how much power is needed to send the single picture versus the plurality of image frames to the remote server, and at the cost per MB to send the single picture versus the plurality of image frames to the remote server. In addition, application processor 12 may look at battery 28 within WCD 10 to determine the remaining battery life of WCD 100.

These factors will vary for each WCD and each user. For example, if WCD 10 is a high-speed phone with unlimited data and good signal strength, application processor 12 should stitch the image frames together locally to form the single picture. On the other hand, if WCD 10 is a low-feature phone, application processor 12 should send the image frames to a remote server for stitching to generate the single picture, unless the data plan associated with WCD 10 is very expensive. In that case, it may be cost prohibitive for application processor 12 to send the plurality of image frames to the remote server and then receive the stitched single picture from the server. In addition, if battery 28 of WCD 10 has full power, application processor 12 may send the image frames to the remote server for stitching to generate the single picture, and receive the single picture back from the remote server. If, however, the power level of battery 28 in WCD 10 is low, application processor 12 may instead stitch the image frames locally to generate the single picture.

After converting the image frames into the single picture, application processor 12 executing AR application 14 requests AR content for the scene represented in the single picture from an AR database server. Application processor 12 may request the AR content for the scene by sending the single picture to the AR database server. In other cases, application processor 12 may request the AR content for the scene by sending one or more of the plurality of image frames to the AR database server. Typically, the AR database server comprises a remote server to WCD 10 such that application processor 12 sends the single picture to the AR database server via TX/RX 26. In the case where a first remote server generates the single picture, the AR database may be stored at the same first remote server or at a different, second remote server. In other examples, the AR database may be stored in WCD 10.

In this disclosure, the techniques are primarily described according to the case where the single picture is sent from WCD 10 to the AR database server to request AR content associated with the scene represented in the single picture. It should be understood, however, that the techniques may also be applied in the case where the plurality of image frames, e.g., the multiple still pictures or the multiple video frames, is sent directly to the AR database server to request AR content for each of the image frames. After the AR content is received, application processor 12 may apply the AR content for each of the image frames to the single picture.

Regardless of how the AR content is requested for the scene, WCD 10 may receive AR content for the entire scene represented in the single picture. Application processor 12 processes the AR content to overlay the single picture. In some examples, display processor 16 may operate along with application processor 12 to perform the processing or rendering of the AR content. Display processor 16 then prepares the single picture with the overlaid AR content for presentation to the user on display 18 of WCD 10. In this way, the user of WCD 10 may comfortably look at the single picture with the overlaid AR content on display 18 to learn more about the surrounding area, e.g., while sitting down or not oriented toward the scene captured in the image.

The AR content may include text and/or graphics representing the AR content for the scene represented in the single picture. The AR content may also include position information for the text and/or graphics corresponding to the single picture. For example, the AR content may include text that describes an event at a venue captured in the single picture. The AR content will also include position information, e.g., (x, y) pixel position, of the venue in the single picture at which to place the text.

Typically, the AR database server will send only the AR content with position information corresponding to the single picture back to application processor 12. For example, each item of the AR content includes associated coordinates in order to place the text and/or graphics representing the AR content at the correct position over the single picture. This is less time and power consuming than the AR database server positioning the AR content over the single picture, and sending the massive single picture with the overlaid AR content back to WCD 10. In some examples, however, the AR database server may send the entire single picture with the overlaid AR content back to WCD 10. In that case, application processor 12 and/or display processor 16 process or render the received single picture with the overlaid AR content for presentation on display 18.

Along with the single picture, application processor 12 may also send location and/or perspective information associated with the creation of the image frames and/or the single picture to the AR database server. In this way, application processor 12 may receive AR content for objects included the scene represented in the single picture at least partially based on the position of the objects relative to the user when the objects were captured. Application processor 12 may receive the location and/or perspective information from one or more sensors 22, such as a compass sensor, a GPS sensor, or the like. Application processor 12 may receive location and/or perspective information for the plurality of image frames that each represents a portion of the scene and that are stitched together to form the single picture. In this way, different portions of the scene represented in the single picture may have different location and/or perspective information. In some cases, application processor 12 may also send time and date information associated with the creation of the image frames and/or the single picture to the AR database server in order to receive AR content for the scene indicating differences between the scene represented in the single picture and previous pictures of the scene.

The hands-free AR techniques described in this disclosure allow for a much more robust view of the scene captured in the single picture than conventional AR techniques. In conventional AR techniques, the user is expecting instantaneous AR content while holding out the WCD and shooting real-time video. This allows for only a limited amount of easily determined AR content to be overlaid on the real-time video. In addition, in conventional techniques, the user may be moving or sweeping the camera in the WCD so that the view of the scene is constantly changing. AR content that takes longer to retrieve may be obsolete by the time the WCD receives the AR content. For example, when the WCD receives the AR content for a particular landmark, the user may have changed the direction of the real-time video such that the particular landmark is no longer included in the scene captured by the real-time video and the AR content is not needed.

According to the techniques of this disclosure, a user is able to sit or stand with the static, single picture of a scene for as long as the user likes. The user, therefore, may be more willing to wait longer for all the AR content associated with the scene represented in the single picture to be retrieved and processed for display. The trade-off for the longer wait time may be a larger quantity and higher level of detail of the AR content including, for example, links to websites and video. The user is also able to navigate across and within the single picture of the scene. For example, the techniques enable the user to perform image operations, such as pan, tilt, scroll, and zoom operations, when viewing the single picture with the overlaid AR content on display 18. In this way, as the user pans and zooms into a particular region or building captured in the single picture, additional AR content within that region may be revealed.

As a more specific example, in response to user input, application processor 12 and/or display processor 16 may perform one or more image operations, e.g., pan, tilt, scroll, and zoom operations, on the single picture to generate a new view of the scene represented in the single picture. After performing the image operations, application processor 12 and/or display processor 16 may update the AR content to overlay the new view in the single picture by one of adding or removing AR content from the single picture. In some cases updating the AR content may include requesting additional AR content for the scene represented in the single picture from the AR database server.

In some cases, application processor 12 may receive location information, such as a GPS reading, and perspective information, such as a compass reading, for each of the plurality of image frames used to generate the single picture. In this way, when a user of WCD 10 focuses on a particular portion of the scene represented in the single picture, application processor 12 may request additional AR content from the AR database server based on the location and/or perspective information received for the image frame that represented the particular portion of the scene. More specifically, the AR content for the portion of the scene will include information based on visible objects in the portion of the scene that were recognized by the AR database server and information based on the position of the visual objects relative to where the user stood when capturing the image frames. For example, if the user zooms in on a given building, the AR content for the building may include a menu associated with a restaurant name recognized on the exterior of the building, and the names of the building itself and other businesses included in the building based on the relative position of the building.

Application processor 12 may determine AR content settings based on user input. The AR content settings may include one or more types of AR content to receive from the AR database server, an amount of AR content to receive from the AR database server, and a time in which to receive the AR content from the AR database server. Application processor 12 may then receive the AR content for the scene represented in the single picture from the AR database server according to the AR content settings. As an example, the user may select to only receive restaurant information with user ratings but without website links in order to quickly choose a restaurant in the area. When the AR content settings change, application processor 12 and/or display processor 16 may update the AR content to overlay the single picture by one of adding or removing AR content from the single picture.

In some cases, the AR content may be received progressively. Some types of AR content that are easier to retrieve may be processed by application processor 12 for immediate display over the single picture. As additional AR content is retrieved and sent back to application processor 12, the additional AR content is processed and displayed over the single picture. In this way, the user may begin receiving some AR content immediately to begin learning about the scene represented in the single picture while the remaining AR content is progressively being retrieved, processed, and displayed. The user may stop the progressive AR content at any time when the user has enough information about the scene. In addition, the techniques may allow at least some of the image frames used to generate the single picture to be streamed to the AR database server in real-time in order to receive at least some AR content. In this case, WCD 10 may receive some AR content to overlay the few seconds of real-time video data used to generate the single picture.

In some cases, the image frames used to generate the single picture may be incomplete or of poor quality. In some examples, application processor 12 may receive requests from the AR database server for additional, higher resolution image frames from WCD 10. This may occur when the AR database server identifies text included in the single picture by filtering the single picture to find text, e.g., using a Gabor filter, and then using optical character recognition (OCR) to read the text. If the identified text is not readable, the AR database server may send a request to application processor 12 for a high resolution picture of the portion of the scene that includes the text.

In other examples, application processor 12 may instruct the AR database server or another remote server to improve the quality of the single picture using additional image frames retrieved from external storage devices, including websites of image stores. For example, the AR database server or another remote server may send additional, publicly available images of the scene represented in the single picture to application processor 12. The additional image frames may be used to increase the size of the single picture and/or the quality of the single picture. As an example, when a user scrolls or pans past the edge of the single picture, the techniques may retrieve the additional image frames based on the location and/or perspective information, e.g., GPS and/or compass readings, at the edge of the scene.

The techniques may also use the additional image frames to create comparison information indicating differences between the scene represented in the single picture and previous pictures of the scene. For example, the AR database server or another remote server may compare the buildings and landmarks of the scene represented in the current single picture against previous pictures of the same scene retrieved from publicly available websites. In this case, application processor 12 may receive the comparison information to indicate which buildings and landmarks, or businesses within the buildings, are new. As an example, the comparison information may be used to indicate new restaurants in the area within the last 6 months, or some other selected time frame.

The hands-free AR techniques of this disclosure may provide several advantages. For example, a user of WCD 10 will not be self-conscious or have people looking at him as a tourist as he uses an AR application to learn more about a particular scene, e.g., a neighborhood or historical landmark. In addition, the techniques provide for less arm fatigue as the user only needs to hold up the WCD one time to capture several still pictures or a few seconds of video. The user may then sit down to view and absorb the single picture with overlaid AR content comfortably without having to be continuously oriented toward the scene represented in the single picture.

In the case where application processor 12 receives the plurality of image frames from camera 20 included in WCD 10, the techniques may use less power to capture the image frames because camera 20 only needs to capture a few seconds of video data versus continually capturing real-time video data and streaming data back and forth with the AR database server to receive all the AR content about the area. In addition, the techniques use less power to communicate with the AR database server because objects included in the scene represented in the single picture only need to be identified and analyzed one time versus continuously recognizing the same object each time the user captures real-time video of that object.

The components of WCD 10 illustrated in FIG. 1 are merely exemplary. In other examples, WCD 10 may include more, fewer, and/or different components. The components of WCD 10 may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. Display 18 in WCD 10 may comprise one of a variety of display devices such as a liquid crystal display (LCD), a plasma display, an organic light emitting diode (OLED) display, or another type of display device.

Memory 24 in WCD 10 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like. Memory 24 may comprise computer-readable storage media for storing media data, as well as other kinds of data. Memory 24 additionally stores instructions and program code that are executed by application processor 12 as part of performing the techniques described in this disclosure.

WCD 10 may operate within a communication system designed to support one or more wireless communication technologies such as code division multiple access (CDMA), frequency division multiple access (FDMA), time division multiple access (TDMA), or orthogonal frequency divisional multiplexing (OFDM). The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCMA operation using long term evolution (LTE) for OFDM. In addition, high data rate (HDR) technologies such as cdma2000 1x EV-DO may be used.

The communication system of WCD 10 may includes one or more base stations (not shown) that support a plurality of mobile wireless or WiFi (e.g., IEEE 802.11x) networks. A communication service provider may centrally operate and administer one or more of these networks using a base station as a network hub.

FIG. 2 is a conceptual diagram illustrating an exemplary WCD 30 executing an augmented reality application according to conventional techniques. Conventionally executed AR applications require a user to continuously hold out WCD 30, as illustrated in FIG. 2, and shoot real-time video of a scene with a camera included in WCD 30. The real-time video is then continually streamed to an AR database server and WCD 30 receives AR content associated with the scene represented in the real-time video from the AR database server. The user of WCD 30 is expecting instantaneous AR content while holding out the WCD and shooting real-time video. This allows for only a limited amount of easily determined AR content to be overlaid on the real-time video.

In the example illustrated in FIG. 2, the user holds out WCD 30 and shoots real-time video of a city street scene that includes buildings, public transportation, and people. WCD 30 sends the real-time video to the AR database server to request AR content for the scene in the real-time video. WCD 30 then receives and displays AR content information 32, 34 and 36 to the user over the live video. In the example of FIG. 2, AR content 32 includes environmental information such as temperature and pollen level, and messaging information for the user. AR content 34 includes public transportation scheduling information associated with the bus included in the street scene. In addition, AR content 36 includes a sale advertisement for a business, such as a restaurant, a retail store, or a tour operator, located in one of the buildings included in the street scene.

The conventional techniques use a large amount of power to continually shoot the real-time video and continually send images of the same objects to be re-identified by the AR database server. For example, WCD 30 may stream the real-time video of the buildings included in the street scene to the AR database server, and may continually receive the same AR content 36 advertising the sale at the business located in one of the buildings.

In addition, the user of WCD 30 may be moving or sweeping the camera in WCD 30 or objects originally included in the scene may move out of the scene such that the view of the street scene is constantly changing. AR content that takes longer to retrieve may be obsolete by the time WCD 30 receives the AR content. For example, by the time WCD 30 receives AR content 34 including public transportation scheduling information associated with a bus originally included in the real-time video, the bus itself may have driven out of the scene represented in the real-time video. In that case, WCD 30 may not use the received AR content 34 because it is not associated with an object included in the current street scene captured in the real-time video. In other cases, WCD 30 may process and display AR content 34 over the real-time video according to the position information, but AR content 34 will be out-of-context because the bus is no longer located in the same position of the real-time video.

Further, the techniques for conventionally executing AR applications in WCD 10 may make the user self conscious when holding out WCD 30 to shoot and receive AR content from real-time video data. Continually holding out WCD 30 can also lead to arm fatigue or "gorilla arms." One existing hands-free augmented reality solution provides hands-free AR to a user via virtual reality (VR) goggles that overlay the AR content on the goggles or glasses worn by the user. The VR goggles may be over-sized and bulky in order to accommodate the display screens to provide an acceptable user experience. The VR goggles, therefore, may be considered "geeky" and make users even more self conscious than holding out a WCD. In addition, the VR goggles are expensive.

In general, the conventional techniques may make users feel self conscious and less likely to use the AR applications. The hands-free techniques described in this disclosure eliminate the fatiguing and awkward portions of using an AR application, and may help AR applications become more ubiquitous on WCDs while preserving battery life.

Figure 3:
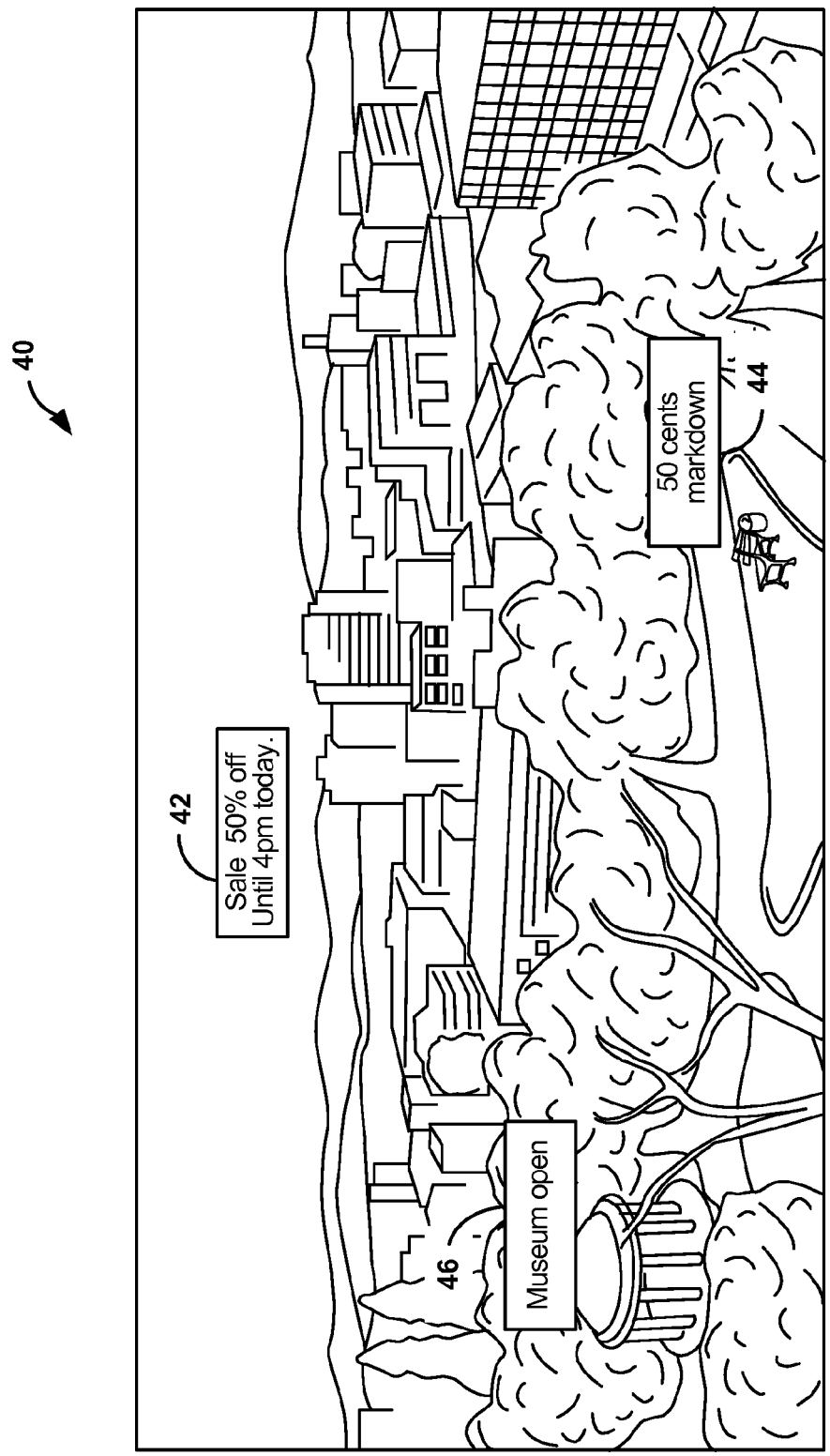
FIG. 3 is a conceptual diagram illustrating a single picture representing a scene with overlaid AR content generated by a WCD executing a hands-free augmented reality application according to an example of the disclosed techniques.

FIG. 3 is a conceptual diagram illustrating a single picture 40 with overlaid AR content 42, 44 and 46 generated by a WCD executing a hands-free augmented reality application according to the disclosed techniques. Single picture 40 is formed by stitching together a plurality of image frames that each represents a portion of a scene in order to represent the entire scene in single picture 40. After the image frames are converted into single picture 40, the WCD receives AR content 42, 44 and 46 for the scene represented in single picture 40 from an AR database server, and processes AR content 42, 44 and 46 to overlay single picture 40 for display to a user. In this way, the user may comfortably look at single picture 40 with the overlaid AR content 42, 44 and 46 on the WCD to learn more about the scene represented in single picture 40, e.g., while not oriented toward the scene captured in the single picture.

In the example of FIG. 3, single picture 40 represents a panoramic picture of an entire neighborhood including a park and buildings. Single picture 40 may be formed from multiple still pictures or from multiple video frames of video data of the scene. As an example, a user of the WCD may take multiple still pictures or record a few seconds of video data of the scene by rotating 180 or 360 degrees from a given location. In this case, single picture 40 may be a single panoramic image generated by stitching together the captured still pictures or video frames.

Single picture 40 may be a very large image with a size of 6000×1280 pixels, for example. Single picture 40 may, therefore, have a format that is larger and, in some cases, substantially larger, than the format of an individual still picture or video frame ordinarily obtained by the camera of the WCD. In some examples, single picture 40 may be larger in a single dimension such as a width direction, relative to an individual still picture or video frame, but maintain the same size in another dimension such as a height dimension, or vice versa. For example, a large, panoramic image may have a much larger width than, but the same height as, an individual picture or video frame. In other examples, single picture 40 may be larger in both width and height. In some examples, single picture 40 may be substantially larger than an individual picture or video frame in at least one dimension, e.g., 1.5 times larger, 2 times larger, 3 times larger, 4 times larger, or even larger.

AR content 42, 44 and 46 associated with the scene represented in single picture 40 is retrieved from the AR database server. As illustrated in FIG. 3, AR content 42, 44 and 46 includes text and/or graphics to describe the scene represented in single picture 40 and position information for the text and/or graphics corresponding to single picture 40. For example, AR content 42 may include text that indicates a sale at a business in one of the buildings included in single picture 40. In this case, AR content 42 received from the AR database server also includes the position information, e.g., (x, y) pixel position, of the business in single picture 40 at which to place the text.

As another example, AR content 44 also includes information about a sale or markdown and a business located in the park included in single picture 40. Again, AR content 44 includes position information corresponding to single picture 40 in order to place the text for AR content 44 in proximity to the business represented in single picture 40. In addition, AR content 46 includes landmark information such as whether a museum in the park included in single picture 40 is open or closed. AR content 46 also includes position information for the museum represented in single picture 40. In some cases, AR content 46 may provide more specific hours of operation for the museum or provide a link to a website for the museum.

AR content 42, 44 and 46 provide just a few examples of the AR content that may be overlaid on single picture 40. In other cases many other types and amounts of AR content may be received and processed for display over single picture 40.

The hands-free AR techniques described in this disclosure allow for a much more robust view of a scene represented in single picture 40 than would be possible for a scene captured in real-time video using conventional AR techniques. According to the techniques of this disclosure, a user is able to sit with the static, single picture 40 of the scene for as long as the user likes. The user, therefore, may be more willing to wait longer for all the AR content associated with single picture 40 to be retrieved and processed for display. The trade-off for the longer wait time may be a larger quantity and higher level of detail of the AR content including, for example, links to websites and video.

The user may be able to navigate across and within single picture 40 of the scene. For example, the techniques enable the user to perform image operations, such as pan, tilt, scroll, and zoom operations when viewing single picture 40 to generate a new view of the scene represented in single picture 40. After performing the image operations, the WCD may update the AR content to overlay the new view in the single picture by one of adding or removing AR content from single picture 40. This may include adding AR content to overlay a portion of single picture 40 that was not visible before the zoom, pan, or scroll operation, and/or removing AR content for a portion of single picture 40 that is no longer visible after the zoom, pan or scroll operation. In some cases, updating the AR content may include requesting additional AR content for the scene represented in single picture 40 from the AR database server. In other cases, updating the AR content may include presenting additional AR content previously received for the scene represented in single picture 40 from the AR database server, but not visible in the displayed portion of single picture 40.

In some cases, the WCD by receive location information, such as a GPS reading, and perspective information, such as a compass reading, for each of the plurality of image frames used to generate single picture 40. In this way, when the user of the WCD moves to a particular portion of the scene represented in single picture 40, additional AR content may be requested from the AR database server based on the location and/or perspective information received for the image frame that represented the particular portion of the scene. More specifically, the AR content for the portion of the scene will include information based on visible objects in the portion of the scene that were recognized by the AR database server and information based on the position of the visual objects relative to where the user stood when capturing the image frame that represented the portion of the scene.

The techniques may also allow the user to indicate AR content settings including one or more types of AR content to receive from the AR database server, an amount of AR content to receive from the AR database server, and a time in which to receive the AR content from the AR database server. The WCD may then receive the AR content for the scene represented in single picture 40 from the AR database server according to the AR content settings. When the AR content settings change, the WCD may update the AR content to overlay single picture 40 by one of adding or removing AR content from single picture 40.

For example, the types of AR content selected for the scene may include one or more of restaurant information such as names, hours and menus, visitor information including lodging and points-of-interest identification, retail sale information, event information including concerts and sporting events, people recognition, emergency services information such locations of police, fire stations, and hospitals, public transportation information such as bus and train schedules, directions, and the like.

The amount of AR content that the user would prefer to see overlying single picture 40 may be specified based on a storage size of the data, e.g., kilobytes (kBs) or megabytes (MBs), a percentage of available data, a percentage of the screen size of the display, or some other measurement. Furthermore, the amount of time in which the user would prefer to receive the AR content for the scene from the AR database server may be specified based on a number of seconds or minutes that the user is willing to wait to receive the AR content to overlay single picture 40. In some cases, at the indicated amount of time, the user may receive a progress update and select to either continue waiting for the indicated AR content or stop receiving and processing the AR content.

In some cases, the AR content for the scene represented in single picture 40 may be received progressively. Some types of AR content that are easier to retrieve may be processed for immediate display over single picture 40. As additional AR content is retrieved and sent back to the WCD, the additional AR content is processed and displayed over single picture 40. In this way, the user may begin receiving some AR content immediately to begin learning about the scene represented in single picture 40 while the remaining AR content is progressively being retrieved, processed, and displayed. The user may stop the progressive AR content at any time when the user has enough information about the scene.

The techniques described above enable control over AR content received for a scene selected from a large variety of AR content types, amounts, and processing times. This control and variety of AR content is not possible in a conventional AR application that uses real-time video to present a limited amount of AR content to a user. The techniques, however, also allow at least some of the image frames used to generate single picture 40 to be streamed to the AR database server in real-time in order to receive at least some AR content. In this case, the WCD may immediately receive some AR content to overlay a few seconds of real-time video data used to generate a portion of single picture 40, and also receive more robust AR content over time for the entire scene represented in the static, single picture 40.

Figure 4:
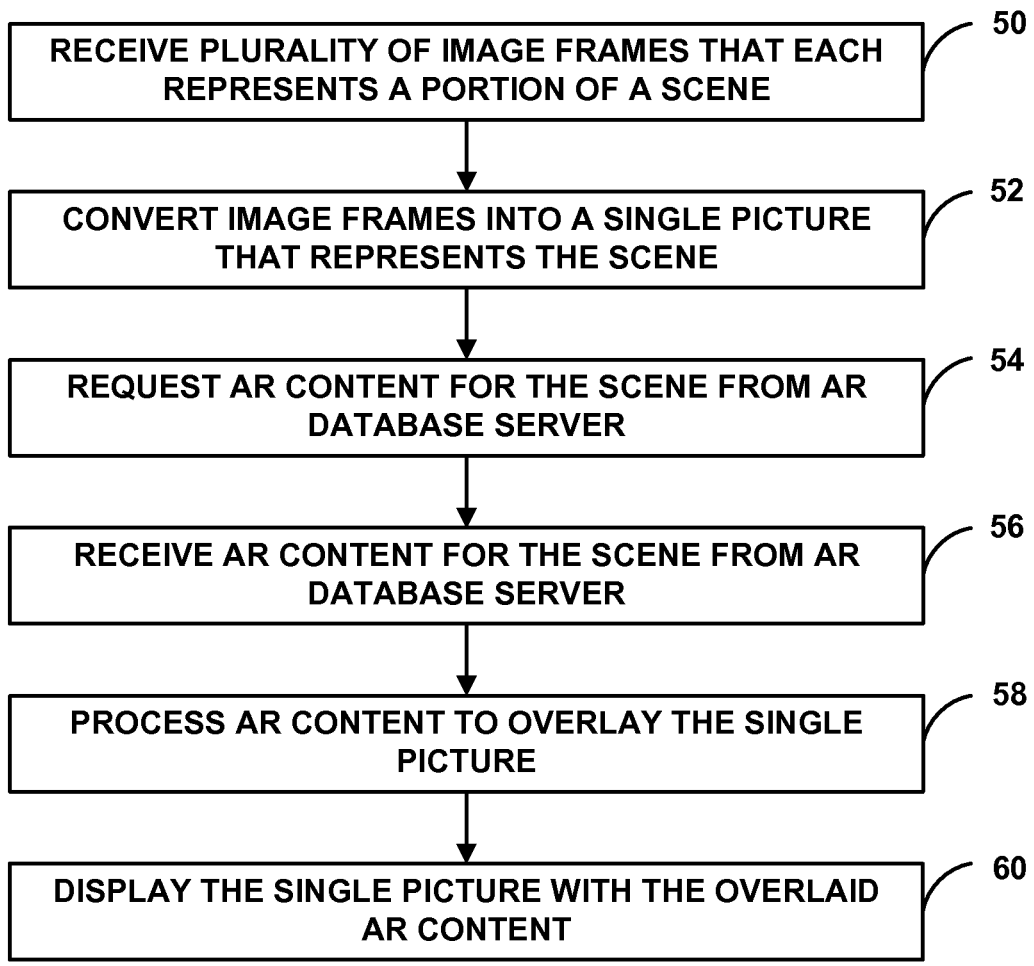
FIG. 4 is a flowchart illustrating an exemplary technique of executing a hands-free augmented reality application with a WCD to overlay AR content on a single picture representing a scene.

FIG. 4 is a flowchart illustrating an exemplary technique of executing a hands-free augmented reality application with a WCD to overlay AR content on a single picture representing a scene. The hands-free AR technique will be described herein with respect to WCD 10 from FIG. 1.

When executing AR application 14, WCD 10 receives a plurality of image frames that each represents a portion of a scene (50). The image frames may be a plurality of still pictures or a plurality of video frames of video data of the scene. The image frames may be captured by camera 20 included in WCD 10 or received from a storage device external to WCD 10. Application processor 12 then converts the plurality of image frames into a single picture that represents the scene (52). The single picture includes the plurality of image frames stitched together to represent a scene. In some examples, application processor 12 may convert the plurality of image frames into the single picture by stitching the image frames together to form the single picture. In other examples, application processor 12 may convert the plurality of image frames into the single picture by sending the image frames to a remote server via TX/RX 26. Application processor 12 may then request that the remote server stitch the image frames together to form the single picture, and receive the single picture back from the remote server. In either case, the image frames may be stitched together in any of a variety of conventional ways, such as those used conventionally to stitch panoramic scenes.

After converting the image frames into the single picture, application processor 12 requests AR content for the scene represented in the single picture from an AR database server (54). Application processor 12 may request the AR content for the scene by sending the single picture to the AR database server, or by sending one or more of the plurality of image frames to the AR database server. In either case, WCD 10 receives AR content for the scene represented in the single picture from the AR database server (56). The AR content may include text and/or graphics representing the information about the scene, and position information for the text and/or graphics corresponding to the single picture. For example, the AR content may include text that describes an event at a venue captured in the single picture, and position information of the venue, e.g., an (x, y) pixel position, in the single picture at which to place the text.

Typically, the AR database server is a remote server to WCD 10 such that application processor 12 sends the single picture to the AR database server via TX/RX 26. In other examples, the AR database may be stored in WCD 10. In some cases, application processor 12 sends location and/or perspective information associated with the creation of the single picture to the AR database server along with the request for AR content for the scene. WCD 10 then receives the AR content for objects in the scene represented in the single picture at least partially based on the position of the objects relative to the user when the objects were captured. Application processor 12 may receive the location and/or perspective information for the scene from one or more sensors 22, such as a compass sensor, a GPS sensor, or the like. In other cases, application processor 12 may send time and date information associated with the creation of the single picture to the AR database server along with the request for AR content for the scene. WCD 10 then receives the AR content for the scene represented in the single picture from the AR database server indicating differences between the scene represented in the single picture and previous pictures of the scene.

Application processor 12 then processes the AR content to overlay the single picture (58). In some examples, display processor 16 may perform at least some of the processing or rendering of the AR content. Display processor 16 then displays the single picture with the overlaid AR content to the user on display 18 (60). In this way, the user may comfortably look at the single picture with the overlaid AR content on a display of the WCD to learn more about the scene represented in the single picture at any time and in any location.

Figure 5:
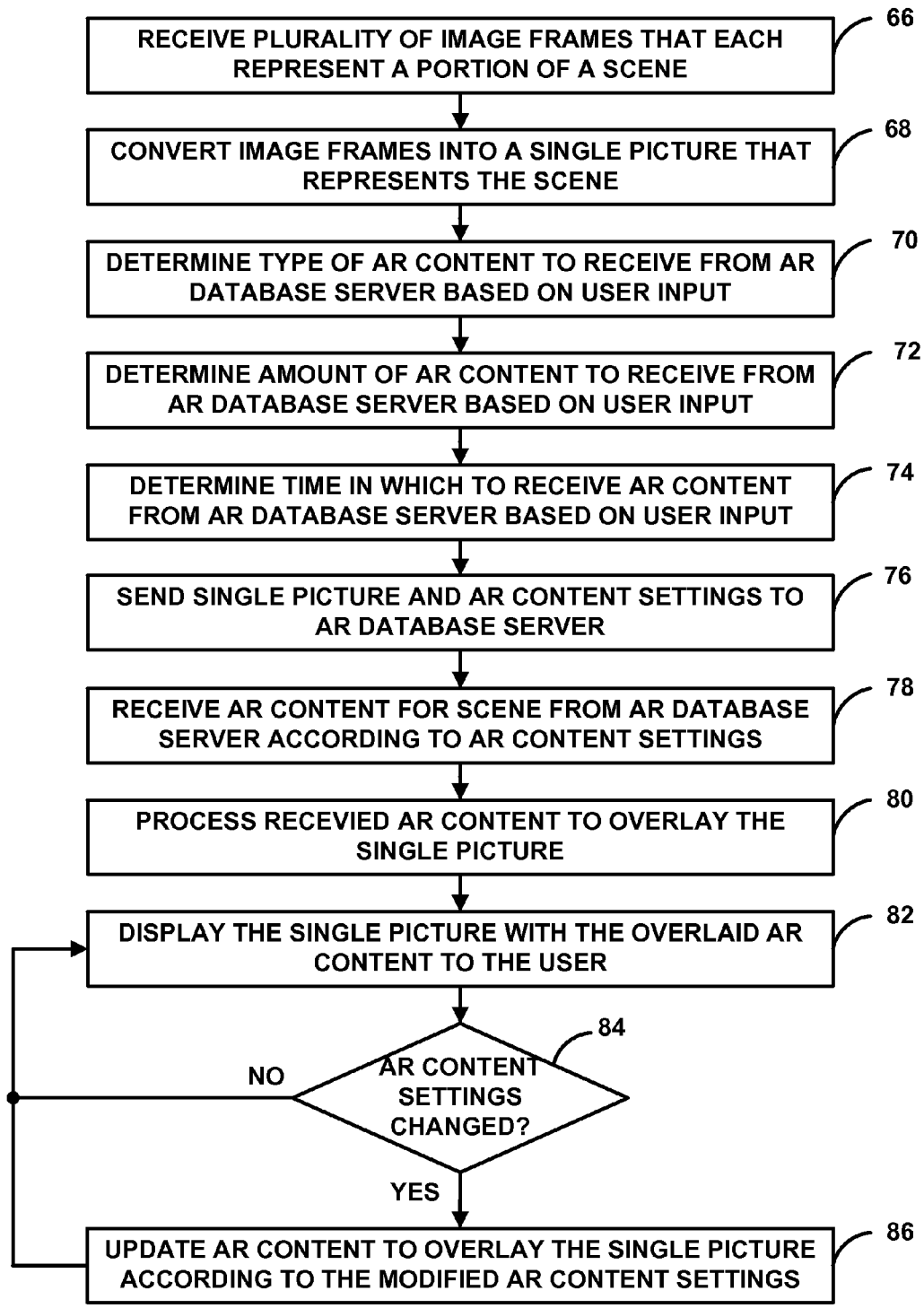
FIG. 5 is a flowchart illustrating an exemplary technique of executing a hands-free augmented reality application according to AR content settings based on user input to the WCD.

FIG. 5 is a flowchart illustrating an exemplary technique of executing a hands-free augmented reality application according to AR content settings based on user input to the WCD. The hands-free AR technique will be described herein with respect to WCD 10 from FIG. 1.

When executing AR application 14, WCD 10 receives a plurality of image frames that each represents a portion of a scene (66). As described above, the image frames may be a plurality of still pictures or a plurality of video frames of video data of the scene. Application processor 12 then converts the plurality of image frames into a single picture that represents the scene (68). The single picture includes the plurality of image frames stitched together to represent a scene.

Application processor 12 then determines AR content settings based on user input. More specifically, application processor 12 determines one or more types of AR content to receive for the scene from the AR database server (70). For example, application processor 12 may receive user input indicating one or more of restaurant information such as names, hours and menus, visitor information including lodging and points-of-interest identification, retail sale information, event information including concerts and sporting events, people recognition, emergency services information such locations of police, fire stations, and hospitals, public transportation information such as bus and train schedules, directions, and the like.

Application processor 12 also determines an amount of AR content to receive for the scene from the AR database server (72). For example, application processor 12 may receive user input indicating an amount of information that the user would prefer to see overlying the single picture on display 18. The amount of AR content may be specified based on a storage size of the data, e.g., kilobytes (kBs) or megabytes (MBs), a percentage of available data, a percentage of the screen size of display 18, or some other measurement.

In addition, application processor 12 determines a time in which to receive the AR content from the scene from the AR database server (74). For example, application processor may receive user input indicating a number of seconds or minutes that the user is willing to wait to receive the AR content to overlay the single picture. In this case, application processor 12 may provide the user with updates specifying a number of seconds or minutes remaining to receive all the AR content requested for the scene. Application processor 12 may also provide the user with notifications of when the type or amount of requested data cannot be received in the amount of time specified. In this case, the user may select to continue waiting, i.e., extend the time setting, or select to stop receiving AR content at the specified time regardless of whether all requested AR data has been received.

Application processor 12 then requests the AR content for the scene by sending the single picture and the AR content settings to an AR database server (76). WCD 10 receives the AR content for the scene represented in the single picture from the AR database server according to the AR content settings (78). Application processor 12 processes the AR content to overlay the single picture (80). As described above, display processor 16 may perform at least some of the processing or rendering of the AR content. Display processor 16 then displays the single picture with the overlaid AR content to the user on display 18 (82).

After the single picture with the overlaid AR content is displayed, the user may modify the AR content settings (84). For example, the user may decide to add or remove a type of AR content from the single picture, or to increase or decrease an amount of AR content to including over the single picture. When the AR content settings have not been changed (NO branch of 84), display processor 16 continues to display the single picture with the original overlaid AR content to the user on display 18 (82). When application processor 12 determines that the AR content settings have changed (YES branch of 84), application processor 12 and/or display processor 16 updates the AR content to overlay the single picture according to the modified AR content settings (86). Updating the AR content may include adding and/or removing certain types of AR content from the single picture. In some cases, application processor 12 may request additional AR content for the scene from the AR database server. After updating the AR content, display processor 16 display the single picture with the modified overlaid AR content to the user on display 18 (82).

In addition to modifying the AR content settings after the single picture with the overlaid AR content is displayed, a user may request application processor 12 to perform one or more of pan, tilt, scroll, and zoom process on the single picture to generate a new view of the scene represented in the single picture. After performing the image effect, application processor 12 may update the AR content to overlay the new view in the single picture by one of adding or removing AR content from the single picture. For example, in the case where the image effect is a zoom-in effect, application processor 12 may request additional AR content for the new view of the scene represented in the single picture from the AR database server. In this way, the user may view general information about the entire scene, e.g., an entire neighborhood, but then view more detailed information about a specific area of the scene, e.g., a single block or a single business, by zooming-in on the representation of that area in the single picture.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of executing an augmented reality application with a wireless communication device (WCD) comprising:
   receiving, with a processor of the WCD, a plurality of image frames each representing a portion of a scene;
   converting the plurality of image frames into a single picture, wherein the single picture comprises at least portions of the plurality of image frames stitched together to represent the scene;
   presenting the single picture to a user of the WCD;
   requesting augmented reality (AR) content for the scene represented in the single picture from an AR database server;
   progressively receiving the AR content for the scene represented in the single picture from the AR database server;
   processing the AR content to overlay the single picture presented to the user of the WCD, wherein processing the AR content to overlay the single picture comprises progressively adding the AR content to the single picture as the AR content is received from the AR database server;
   performing a zoom process on the single picture to generate a new view of the scene represented in the single picture; and
   updating the AR content to overlay the new view in the single picture, wherein updating the AR content comprises one of adding or removing AR content of the single picture.

2. The method of claim 1, wherein the plurality of image frames comprises one of a plurality of still pictures or a plurality of video frames of video data of the scene.

3. The method of claim 1, wherein receiving the plurality of image frames comprises one or more of receiving image frames captured with a camera included in the WCD, or receiving image frames from a storage device external to the WCD.

4. The method of claim 1, wherein requesting the AR content comprises sending one of the single picture or the portions of the image frames to the AR database server.

5. The method of claim 1, wherein converting the plurality of image frames into a single picture comprises stitching, with the processor of the WCD, the portions of the image frames together to form the single picture.

6. The method of claim 1, wherein converting the image data to a single picture comprises:
   sending the plurality of image frames to a remote server;
   instructing the remote server to stitch together the portions of the image frames to form the single picture; and
   receiving the single picture from the remote server.

7. The method of claim 1, wherein the AR database server comprises a remote server.

8. The method of claim 1, further comprising:
   determining AR content settings for the scene represented in the single picture based on user input; and sending the AR content settings for the scene to the AR database server, wherein progressively receiving AR content comprises progressively receiving the AR content for the scene represented in the single picture from the AR database server according to the AR content settings.

9. The method of claim 8, wherein determining the AR content settings comprises receiving user input indicating one or more types of AR content to receive from the AR database server for the scene.

10. The method of claim 8, wherein determining the AR content settings comprises receiving user input indicating an amount of AR content to receive from the AR database server for the scene.

11. The method of claim 8, wherein determining the AR content settings comprises receiving user input indicating an amount of time in which to receive the AR content for the scene from the AR database server.

12. The method of claim 8, further comprising:
receiving user input indicating a modification to the AR content settings for the scene; and
updating the AR content to overlay the single picture according to the modified AR content settings, wherein updating the AR content comprises one of adding or removing AR content from the single picture.

13. The method of claim 1, further comprising requesting additional AR content for the scene represented in the single picture from the AR database server, and processing the additional AR content to overlay the single picture in addition to the existing AR content for display on the WCD.

14. The method of claim 1, further comprising:
receiving one or more of location information or perspective information from one or more sensors for each of the plurality of image frames that represents a portion of the scene; and
sending the one or more of the location information or the perspective information for at least one portion of the scene to the AR database server,
wherein progressively receiving AR content comprises progressively receiving the AR content for the portion of the scene represented in the single picture from the AR database server at least partially based on the one or more of the location information or the perspective information for the portion of the scene.

15. The method of claim 1, wherein the AR content comprises one or more of text or graphics representing the AR content for the scene represented in the single picture, and position information for the one or more of the text or the graphics corresponding to the single picture.

16. The method of claim 1, wherein the AR content comprises one or more of text or graphics that indicates differences between the scene represented in the single picture and previous pictures of the scene.

17. A wireless communication device (WCD) for executing an augmented reality application, the WCD comprising:
a memory configured to store image data; and
a processor configured to:
receive a plurality of image frames each representing a portion of a scene,
convert the plurality of image frames into a single picture, wherein the single picture comprises at least portions of the plurality of image frames stitched together to represent the scene,
present the single picture to a user of WCD,
request augmented reality (AR) content for the scene represented in the single picture from an AR database server,
progressively receive the AR content for the scene represented in the single picture from the AR database server,
process the AR content to overlay the single picture presented to the user of the WCD, wherein the processor is configured to progressively add the AR content to the single picture as the AR content is received from the AR database server,
perform a zoom process on the single picture to generate a new view of the scene represented in the single picture, and
update the AR content to overlay the new view in the single picture, wherein updating the AR content comprises one of adding or removing AR content of the single picture.

18. The WCD of claim 17, wherein the plurality of image frames comprises one of a plurality of still pictures or a plurality of video frames of video data of the scene.

19. The WCD of claim 17, further comprising a camera included in the WCD to capture image frames, wherein the processor receives the plurality of image frames from one or more of the camera included in the WCD or a storage device external to the WCD.

20. The WCD of claim 17, further comprising a transmitter, wherein the processor sends one of the single picture or the portions of the image frames to the AR database server via the transmitter to request the AR content for the scene.

21. The WCD of claim 17, wherein the processor stitches the portions of the image frames together to form the single picture.

22. The WCD of claim 17, further comprising a transmitter and a receiver, wherein the processor sends the plurality of image frames to a remote server via the transmitter, instructs the remote server to stitch together the portions of the image frames to form the single picture, and receives the single picture from the remote server via the receiver.

23. The WCD of claim 17, wherein the AR database server comprises a remote server.

24. The WCD of claim 17, wherein the processor determines AR content settings for the scene represented in the single picture based on user input, sends the AR content settings for the scene to the AR database server, and progressively receives the AR content for the scene represented in the single picture from the AR database server according to the AR content settings.

25. The WCD of claim 24, wherein the processor receives user input indicating one or more types of AR content to receive from the AR database server for the scene.

26. The WCD of claim 24, wherein the processor receives user input indicating an amount of AR content to receive from the AR database server for the scene.

27. The WCD of claim 24, wherein the processor receives user input indicating an amount of time in which to receive the AR content for the scene from the AR database server.

28. The WCD of claim 24, wherein the processor receives user input indicating a modification to the AR content settings for the scene, and updates the AR content to overlay the single picture according to the modified AR content settings, wherein updating the AR content comprises one of adding or removing AR content from the single picture.

29. The WCD of claim 17, wherein the processor requests additional AR content for the scene represented in the single picture from the AR database server, and processes the additional AR content to overlay the single picture in addition to the existing AR content for display on the WCD.

30. The WCD of claim 17, wherein the processor receives at least one of location information or perspective information from one or more sensors for each of the plurality of image frames that represents a portion of the scene, sends the one or more of the location information or the perspective information for at least one portion of the scene to the AR database server, and progressively receives the AR content for the portion of the scene represented in the single picture from the AR database server at least partially based on the one or more of the location information or the perspective information for the portion of the scene.

31. The WCD of claim 17, wherein the AR content comprises one or more of text or graphics representing the AR content for the scene represented in the single picture, and position information for the one or more of the text or the graphics corresponding to the single picture.

32. The WCD of claim 17, wherein the AR content comprises one or more of text or graphics that indicate differences between the scene represented in the single picture and previous pictures of the scene.

33. A wireless communication device (WCD) for executing an augmented reality application comprising:
   means for receiving a plurality of image frames each representing a portion of a scene;
   means for converting the plurality of image frames into a single picture, wherein the single picture comprises at least portions of the plurality of image frames stitched together to represent the scene;
   means for presenting the single picture to a user of the WCD;
   means for requesting augmented reality (AR) content for the scene represented in the single picture from an AR database server;
   means for progressively receiving the AR content for the scene represented in the single picture from the AR database server;
   means for processing the AR content to overlay the single picture presented to the user of the WCD, wherein the means for processing the AR content to overlay the single picture comprise means for progressively adding the AR content to the single picture as the AR content is received from the AR database server;
   means for performing a zoom process on the single picture to generate a new view of the scene represented in the single picture; and
   means for updating the AR content to overlay the new view in the single picture, wherein updating the AR content comprises one of adding or removing AR content of the single picture.

34. The WCD of claim 33, wherein the means for converting the plurality of image frames into a single picture comprise means for stitching the portions of the image frames together to form the single picture.

35. The WCD of claim 33, wherein the means for converting the image data to a single picture comprise:
   means for sending the plurality of image frames to a remote server;
   means for instructing the remote server to stitch the portions of the image frames together to form the single picture; and
   means for receiving the single picture from the remote server.

36. The WCD of claim 33, further comprising:
   means for determining AR content settings for the scene represented in the single picture based on user input;
   means for sending the AR content settings for the scene to the AR database server; and
   means for progressively receiving the AR content for the scene represented in the single picture from the AR database server according to the AR content settings.

37. The WCD of claim 36, further comprising:
   means for receiving user input indicating a modification to the AR content settings for the scene; and
   means for updating the AR content to overlay the single picture according to the modified AR content settings, wherein updating the AR content comprises one of adding or removing AR content from the single picture.

38. A non-transitory computer-readable medium comprising instructions for executing an augmented reality application that when executed in a wireless communication device (WCD) cause one or more programmable processors to:
   receive a plurality of image frames each representing a portion of a scene;
   convert the plurality of image frames into a single picture, wherein the single picture comprises at least portions of the plurality of image frames stitched together to represent the scene;
   present the single picture to a user of the WCD;
   request augmented reality (AR) content for the scene represented in the single picture from an AR database server;
   progressively receive the AR content for the scene represented in the single picture from the AR database server;
   process the AR content to overlay the single picture presented to the user of the WCD, wherein the instructions cause the one or more processors to progressively add the AR content to the single picture as the AR content is received from the AR database server;
   perform a zoom process on the single picture to generate a new view of the scene represented in the single picture; and
   update the AR content to overlay the new view in the single picture, wherein updating the AR content comprises one of adding or removing AR content of the single picture.

39. The non-transitory computer-readable medium of claim 38, wherein the instructions that cause the processors to convert the plurality of image frames into a single picture further comprise instructions that cause the processors to stitch the portions of the image frames together to form the single picture.

40. The non-transitory computer-readable medium of claim 38, wherein the instructions that cause the processors to convert the plurality of image frames into a single picture further comprise instructions that cause the processors to:
   send the plurality of image frames to a remote server;
   instruct the remote server to stitch the portions of the image frames together to form the single picture; and
   receive the single picture from the remote server.

41. The non-transitory computer-readable medium of claim 38, further comprising instructions that cause the processors to:
   determine AR content settings for the scene represented in the single picture based on user input;
   send the AR content settings for the scene to the AR database server; and
   progressively receive the AR content for the scene represented in the single picture from the AR database server according to the AR content settings.

42. The non-transitory computer-readable medium of claim 41, further comprising instructions that cause the processors to:
   receive user input indicating a modification to the AR content settings for the scene; and update the AR content to overlay the single picture according to the modified AR content settings, wherein updating the AR content comprises one of adding or removing AR content from the single picture.

\* \* \* \* \*